United States Patent
Parsons

(10) Patent No.: US 9,188,250 B1
(45) Date of Patent: Nov. 17, 2015

(54) SEALS FOR EXPANDABLE TUBULAR

(71) Applicant: Ronald C. PARSONS and Denise M. PARSONS, trustees under the Ronald C. PARSONS and Denise M., Houston, TX (US)

(72) Inventor: Ronald C. Parsons, Houston, TX (US)

(73) Assignee: Ronald C. Parsons and Denise M. Parsons, Houston, TX (US), Trustees Under the Ronald C. Parsons and Denise M. Parsons Living Trust Dated Oct. 9, 2013

( * ) Notice: Subject to any disclaimer, the term of this patent is extended or adjusted under 35 U.S.C. 154(b) by 0 days.

(21) Appl. No.: 14/303,121

(22) Filed: Jun. 12, 2014

(51) Int. Cl.
  *F16L 55/16* (2006.01)
  *F16L 5/10* (2006.01)

(52) U.S. Cl.
  CPC .......................................... *F16L 5/10* (2013.01)

(58) Field of Classification Search
  CPC ..... F16L 55/162; F16L 55/163; F16L 55/165; F16L 55/1653
  USPC ...................................... 138/97, 98; 166/207
  See application file for complete search history.

(56) References Cited

U.S. PATENT DOCUMENTS

| | | | | |
|---|---|---|---|---|
| 2,812,025 A * | 11/1957 | Teague et al. | | 166/207 |
| 3,149,646 A * | 9/1964 | Xenis | | 138/97 |
| 3,245,471 A * | 4/1966 | Howard | | 166/387 |
| 3,700,265 A * | 10/1972 | Dufour et al. | | 285/15 |
| 4,349,204 A * | 9/1982 | Malone | | 277/334 |
| 4,386,629 A * | 6/1983 | Cook et al. | | 138/110 |
| 5,076,618 A * | 12/1991 | Bridges | | 285/370 |
| 5,400,827 A * | 3/1995 | Baro et al. | | 138/98 |
| 5,787,933 A * | 8/1998 | Russ et al. | | 138/98 |
| 6,467,261 B1 * | 10/2002 | Hisanaga et al. | | 60/323 |
| 6,745,845 B2 * | 6/2004 | Cook et al. | | 166/387 |
| 6,994,118 B2 * | 2/2006 | Kiest et al. | | 138/98 |
| 7,401,647 B2 * | 7/2008 | Baycroft et al. | | 166/277 |
| 7,452,161 B2 * | 11/2008 | Freyer et al. | | 405/184.1 |
| 7,520,335 B2 * | 4/2009 | Richard et al. | | 166/384 |
| 7,954,516 B2 * | 6/2011 | Hallundbaek | | 138/98 |
| 8,028,749 B2 * | 10/2011 | Mchardy et al. | | 166/207 |
| 2003/0106601 A1 * | 6/2003 | Kweon | | 138/98 |
| 2003/0205386 A1 * | 11/2003 | Johnston et al. | | 166/382 |
| 2004/0016539 A1 * | 1/2004 | Richard | | 166/207 |
| 2004/0074640 A1 * | 4/2004 | Anderton et al. | | 166/277 |
| 2004/0231858 A1 * | 11/2004 | Waddell et al. | | 166/380 |
| 2004/0238181 A1 * | 12/2004 | Cook et al. | | 166/378 |
| 2005/0150654 A1 * | 7/2005 | Kirk et al. | | 166/206 |
| 2005/0173115 A1 * | 8/2005 | Maimets | | 166/277 |

(Continued)

*Primary Examiner* — James Hook
(74) *Attorney, Agent, or Firm* — Timothy S. Westby; Porter Hedges LLP

(57) ABSTRACT

Herein disclosed is an assembly comprising an expandable tubular; a section of multiple O rings placed circumferentially over the tubular; and an adhesive between the O rings. In some embodiments, the multiple O rings are made of rubber or a rubber-like material. In some embodiments, the diameter of the O rings is determined by the expanded outer diameter (OD) of the tubular. In some embodiments, the adhesive is compressible and expandable. In some embodiments, the adhesive is able to withstand temperatures and chemicals found in downhole conditions. Also disclosed herein is a method of applying seals on an expandable tubular comprising: providing an expandable tubular; placing a section of multiple O rings circumferentially over the tubular; and applying an adhesive between the O rings.

18 Claims, 3 Drawing Sheets

(56) References Cited

U.S. PATENT DOCUMENTS

| | | | |
|---|---|---|---|
| 2005/0183864 A1* | 8/2005 | Trinder et al. | 166/382 |
| 2006/0118192 A1* | 6/2006 | Cook | 138/114 |
| 2006/0196678 A1* | 9/2006 | Connell et al. | 166/380 |
| 2007/0284872 A1* | 12/2007 | Pionetti | 285/55 |
| 2009/0000681 A1* | 1/2009 | Averbuch et al. | 138/112 |
| 2010/0263759 A1* | 10/2010 | Maimets et al. | 138/98 |
| 2010/0314130 A1* | 12/2010 | Durst et al. | 166/382 |
| 2013/0140022 A1* | 6/2013 | Leighton et al. | 166/277 |
| 2014/0054047 A1* | 2/2014 | Zhou | 166/382 |

* cited by examiner

SEALS FOR EXPANDABLE TUBULAR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. Field of the Invention

The present invention generally relates to seals for an expandable tubular. More particularly, the present invention describes a method of applying seals for an expandable tubular in downhole applications.

2. Background of the Invention

In recent years, the use of expandable tubulars has become more common in the drilling, repair, and completion phases of well bore construction. In these phases, it is necessary to protect tubulars (e.g., casing, tubing, and/or seal bores) from scarring; and/or to protect sealing and anchoring devices; and/or to prevent the tubulars from being scarred while being run down hole.

In some cases, due to the limits of expansion of the expandable tubulars (e.g., casings and tubings), the outside/outer diameter (OD) of the tubular is as close as possible to the inside/inner diameter (ID) of the wellbore or casing. Rubber rings and other devices are either molded or attached to the expandable tubular to act as centralizers and seals after the tubular is expanded. The rubber rings may also serve to keep anchoring devices (anchors) attached to the tubular from scarring the casing and/or seal bores. During the expansion process, the anchoring devices (anchors) are pressed into the casing and hold the tubular in place; and the rubber rings or other devices would function as seals.

Because the OD of the tubing and seals and anchors is very close to the casing ID, if the tubing or seals touch the casing, the seals will compress below the tolerance of the anchors and damage the casing and/or seal bores. The anchors can also be dislodged causing more damage. In addition, the tubing and casing can be scarred causing it to split.

It is difficult to attach a centralizer to the tubing due to the clearance. Rubber or compressible material is applied that is slightly larger than the attachments. This rubber acts as centralizers and also protects the attachments. Since they are rubber, they will compress when the tubing rubs the casing, and the attachments will hit the casing wall. This will cause damage to the casing and tubing. If the tubing is scarred, it can split when expanded and the attachments can be damaged. After expanding, the rubbers become seals.

Seals are used with expandable tubing to seal the area between the expanded tubing and casing to restrict the well pressure from escaping between the two pipes. Having the rubber seals manufactured on the tubing requires a large amount of time. The seals are molded on and require machining to size. In some cases, there is damage to the tubing during the handling and chucking process. At times, it takes several weeks to complete the molded seals.

Accordingly, there is continuing need and interest to develop seals for expandable tubulars/assemblies.

SUMMARY

Herein disclosed is an assembly comprising an expandable tubular; a section of multiple O rings placed circumferentially over the tubular; and an adhesive between the O rings. In some embodiments, the multiple O rings are made of rubber or a rubber-like material. In some embodiments, the diameter of the O rings is determined by the expanded outer diameter (OD) of the tubular. In some embodiments, the adhesive is compressible and expandable. In some embodiments, the adhesive is able to withstand temperatures and chemicals found in downhole conditions.

In some embodiments, at least one section of the expandable tubular has a larger outer diameter than the remainder of the expandable tubular, forming at least one complete or partial ring as at least one centralizer. In some embodiments, the assembly comprises two centralizers on the two sides of the section of multiple O rings. In some embodiments, the assembly comprises comprising more than one section of multiple O rings. In some embodiments, the multiple O rings function as seals after the tubular is expanded downhole. In some embodiments, the tubular comprises a casing, a liner, a screen, or a production tubing.

Also disclosed herein is a method of applying seals on an expandable tubular comprising: providing an expandable tubular; placing a section of multiple O rings circumferentially over the tubular; and applying an adhesive between the O rings. In some embodiments, the multiple O rings are made of rubber or a rubber-like material. In some embodiments, the diameter of the O rings is determined by the expanded outer diameter (OD) of the tubular.

In some embodiments, the adhesive is compressible and expandable and able to withstand temperatures and chemicals found in downhole conditions. In some embodiments, the adhesive on the outside of the O rings is removed. In some embodiments, the method comprises curing the adhesive.

In some embodiments, the method further comprises forming at least one complete or partial centralizing ring as at least one centralizer, having a larger outer diameter than the remainder of the expandable tubular. In some embodiments, the method comprises forming two centralizers on the two sides of the section of multiple O rings. In some embodiments, the method comprises circumferentially placing more than one section of multiple O rings over the tubular. In some embodiments, the multiple O rings function as seals after the tubular is expanded downhole.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 1A, bottom graph, illustrates an expandable tubing or liner having centralizers with slip-on thread protectors, seals and anchor aggregates, according to embodiments of this disclosure. FIG. 1A is a side view and FIG. 1B is an end view.

DETAILED DESCRIPTION

Overview. To centralize an expandable tubular, at least a section of the tubular is enlarged to have a larger OD than the remainder of the expandable tubular, forming at least one complete centralizing ring or at least one partial centralizing ring (i.e., a complete ring of 360 degrees or a segment/segments thereof as a partial ring). When the tubular is being placed downhole, the centralizing rings (complete and/or partial) serve to centralize the tubular whiling minimizing scarring and protecting the seals and anchors. After the tubular is placed downhole and radially expanded, the centralizing ring will expand along with the remainder of the tubular and the expanded tubular will have the same diameter. In other words, these centralizing rings (complete and/or partial) function to centralize the expandable tubular and then disappear after the tubular is expanded.

Such centralizers prevent damage and do not cause any problem when the tubing is expanded. The centralizers disappear after expansion to maintain the continuity of the expanded tubing, liner or casing.

As used herein, the term "tubular" refers to any tubular parts or components, especially related to the oil/gas/water well applications and downhole processes. Examples of such tubulars include a casing, a liner, a screen, or a production tubing.

As used herein, the term "seal" refers to any sealing component or sealing mechanism as known to one skilled in the art. For example, seals are made of rubber or rubber-like material, attached to a tubular. The seals are generally placed where necessary to perform a sealing function. In some cases, the seals have a thickness of from 1/16 inch to any required thickness. When a tubular is expanded, the seals are compressed, e.g., sealing the space between a casing and a tubing.

As used herein, the term "anchor" refers to any anchoring component/aggregate or anchoring mechanism as known to one skilled in the art, used to hold a device in place. There are various types of anchors. The anchors are generally made of a material much harder than the tubular (e.g., tubing or casing). The anchors are attached to the tubular by cement or welded onto the outside of the tubular. In some cases, when a tubing is expanded, the anchors attached to the tubing are embedded in the casing and tubing, holding the tubing in place.

In an embodiments, O rings are placed on an expandable tubular at desired locations(s) as seals. In various embodiments, the O rings are made of rubber or rubber-like material. The type of material (e.g., rubber) depends downhole conditions, such as heat, pressure, chemicals of use, and operation conditions. The O rings may be any size and/or hardness as needed/desired. In some cases, such O rings are available commercially. The total length of the seals needed determines the number of O rings. The diameter of the O rings is determined by the expanded outer diameter (OD) of the tubing and the inner diameter (ID) of the casing.

Figure 1A:
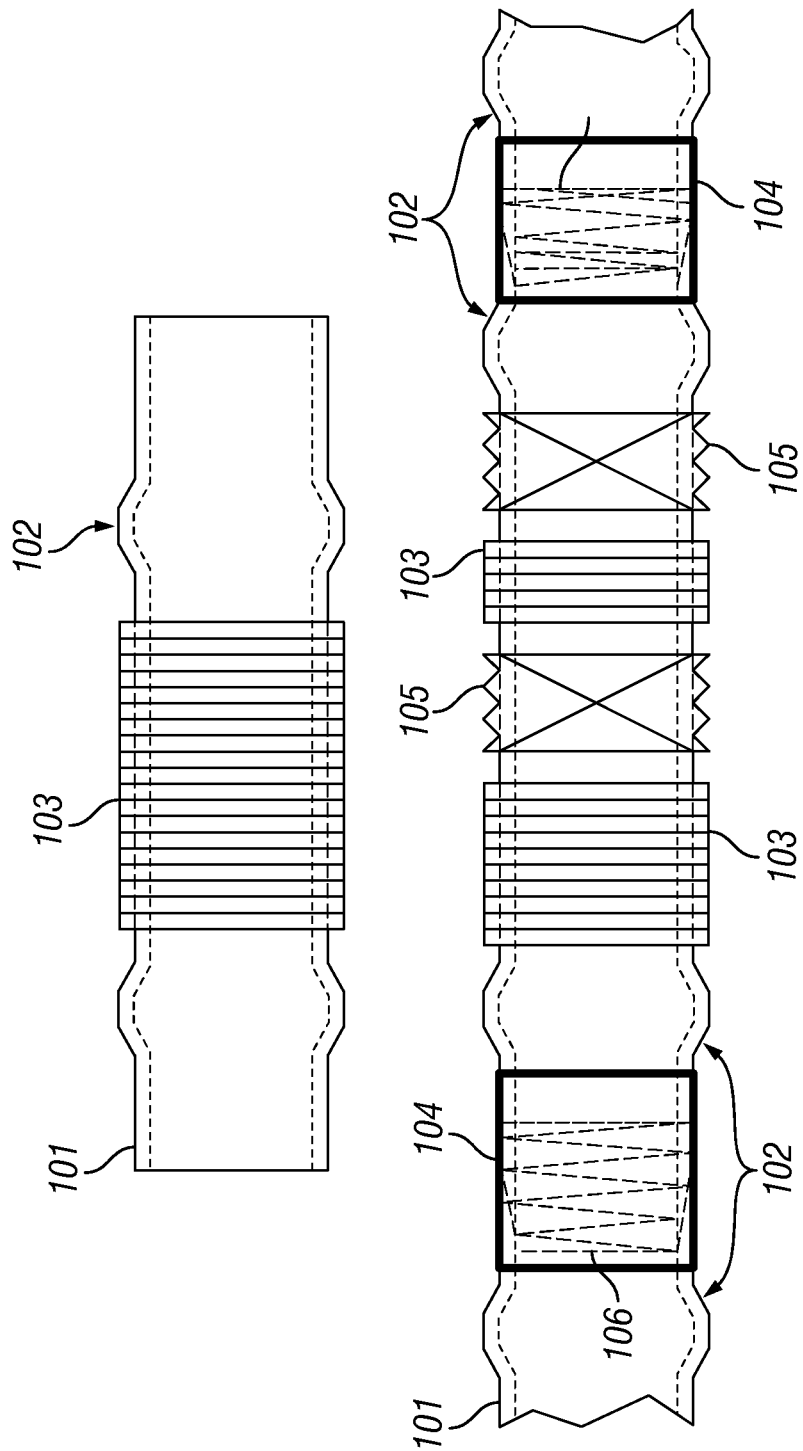
FIG. 1A, top graph, illustrates an expandable tubing or liner with seals (O rings) and centralizers on the two sides of the seals for protection.
Figure 1B:
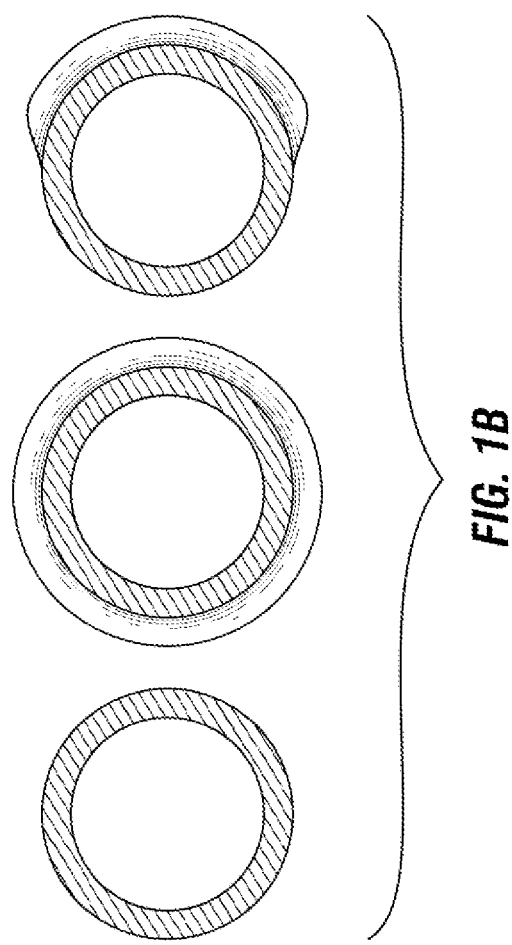
FIG. 1B (from left to right) illustrates an expandable tubular before expansion, a complete centralizing ring on a tubular, and a partial centralizing ring.

As shown in FIG. 1A, the top portion illustrates an expandable tubing or liner (101) with seals (O rings 103) and centralizers (102) on the two sides of the seals for protection. The bottom portion illustrates an expandable tubing or liner (101) having centralizers (102) with slip-on thread protectors (104), seals (103) and anchor aggregates (105), according to embodiments of this disclosure. 106 represents made up thread. FIG. 1B from left to right shows an expandable tubular before expansion, a complete centralizer or centralizing ring (360 degrees) on a tubular, and a partial centralizing ring on a tubular.

Figure 2:
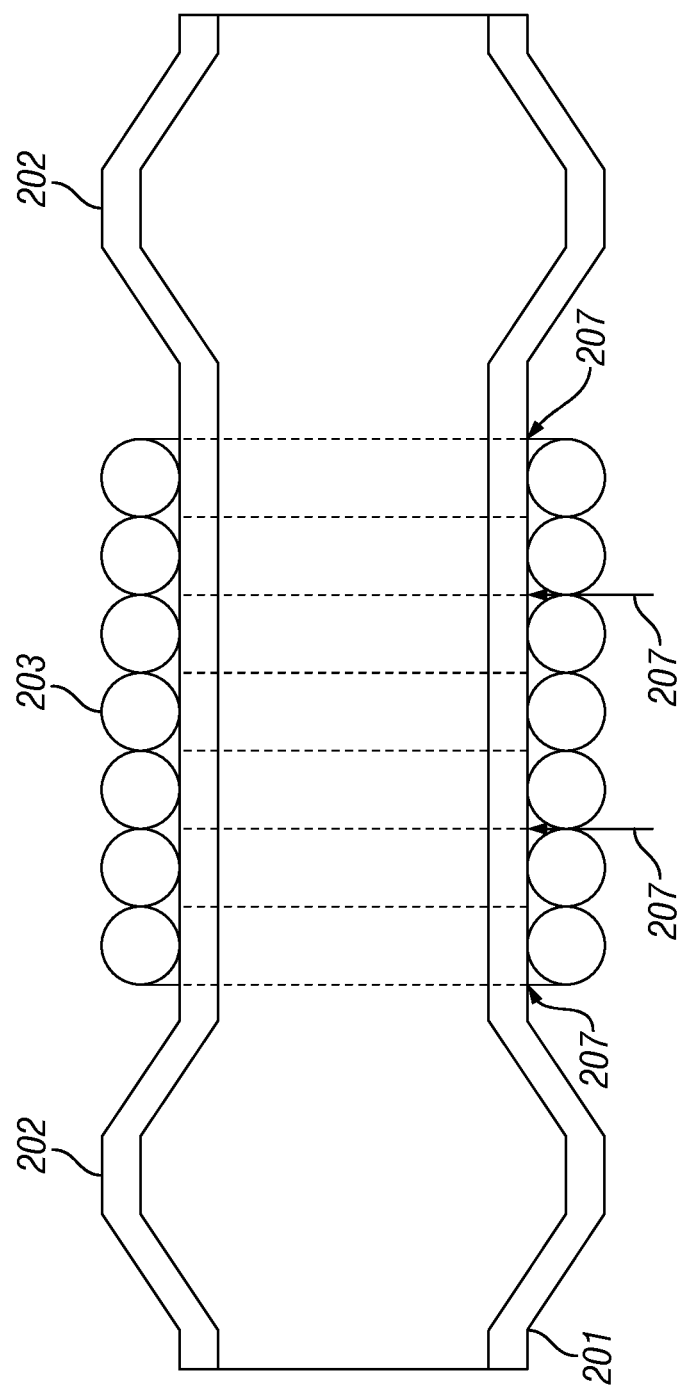
FIG. 2 is a cross section view, illustrating the O ring seals and the expandable adhesive/glue, according an embodiment of this disclosure.

In an embodiment, the O rings are placed in position over an expandable tubular. A small spacing is allowed between the O rings for expansion and adhesive application. An adhesive or glue is brushed between the O rings. The o rings are then lightly pushed together. The adhesive on the outside of the O rings is removed. The adhesive is then allowed to cure for a period of time. FIG. 2 is a cross section view, illustrating the O ring seals (203) and the expandable adhesive (207). 201 represents the expandable tubular (tubing or liner); 202 represents the expanded centralizers. In some cases, when the tubular has the centralizers as described herein and as shown in FIGS. 1A-1B or FIG. 2, the tubular with the centralizers and seals can be shipped before the cure is complete because the centralizers protect the seals.

In various embodiments, the adhesive is designed to adhere to rubber and metal (e.g., steel). The adhesive is compressible and expandable and able to withstand temperatures and chemicals found in well conditions.

Advantages. The method of applying seals of this disclosure reduces lead time and manufacturing cost. The O-ring seals are selected or designed for different well conditions. They can also be replaced in the field. Such O-ring seals are concentric with the tubular. They will have the same thickness if the tubular is egged out of the round shape.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. An assembly comprising
an expandable tubular, wherein at least one section of the expandable tubular has a larger outer diameter than another section of the expandable tubular, forming at least one partial ring as at least one centralizer and optionally at least one additional complete or partial ring as a centralizer;
wherein the another section of the tubular comprises multiple O rings in contact with one another and placed circumferentially over the another section of the tubular; and
an adhesive between the O rings.

2. The assembly of claim 1 wherein the multiple O rings are made of rubber or a rubber-like material.

3. The assembly of claim 1 wherein the diameter of the O rings is determined by the expanded outer diameter (OD) of the tubular.

4. The assembly of claim 1 wherein the adhesive is compressible and expandable.

5. The assembly of claim 1 wherein the adhesive is able to withstand temperatures and chemicals found in downhole conditions.

6. The assembly of claim 1 comprising a centralizer to each side of the another section of multiple O rings.

7. The assembly of claim 1 comprising more than one section of multiple O rings.

8. The assembly of claim 1 wherein the multiple O rings function as seals after the tubular is expanded downhole.

9. The assembly of claim 1 wherein said tubular comprises a casing, a liner, a screen, or a production tubing.

10. A method of applying seals on an expandable tubular comprising:
   providing an expandable tubular, wherein at least one section of the expandable tubular has a larger outer diameter than another section of the expandable tubular, forming at least one partial ring as at least one centralizer and optionally at least one additional complete or partial ring as a centralizer;
   placing multiple O rings in contact with one another, and circumferentially around the another section of the tubular; and
   applying an adhesive between the O rings.

11. The method of claim 10 wherein the multiple O rings are made of rubber or a rubber-like material.

12. The method of claim 10 wherein the diameter of the O rings is determined by the expanded outer diameter (OD) of the tubular.

13. The method of claim 10 wherein the adhesive is compressible and expandable and able to withstand temperatures and chemicals found in downhole conditions.

14. The method of claim 10 wherein the adhesive on the outside of the O rings is removed.

15. The method of claim 10 further comprising curing the adhesive.

16. The method of claim 10 wherein said tubular comprises a centralizer adjacent each side of the another section of multiple O rings.

17. The method of claim 10 comprising circumferentially placing multiple O rings over a second another section the tubular, wherein the second another section of the tubular is separated from the another section by at least one centralizer.

18. The method of claim 10 wherein the multiple O rings function as seals after the tubular is expanded downhole.

* * * * *